INVENTOR:
ROBERT G. DEXTER
BY
Carl C. Batz ATT'Y

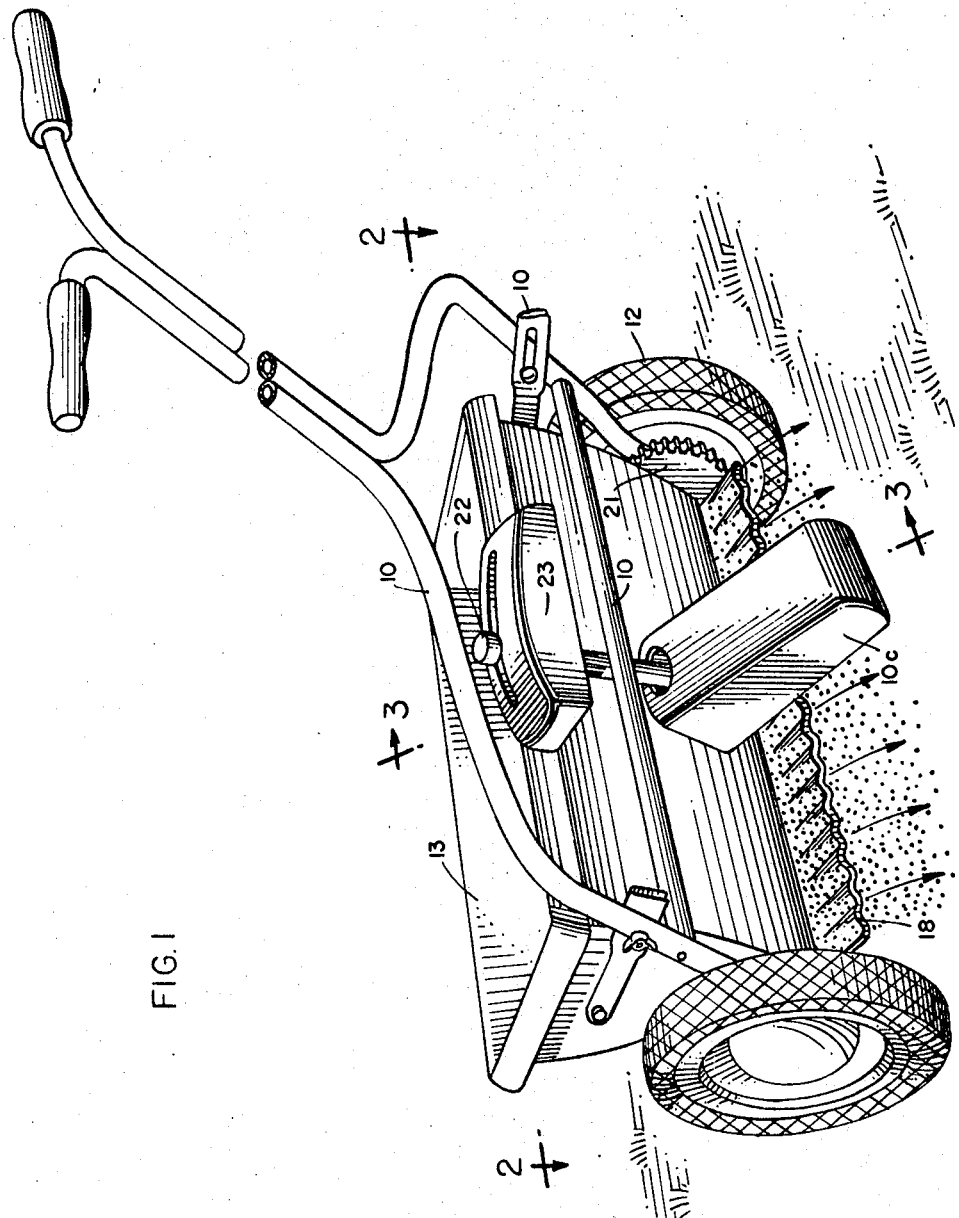
FIG. I
INVENTOR:
ROBERT G. DEXTER
BY
*Carl C. Batz*
ATT'Y

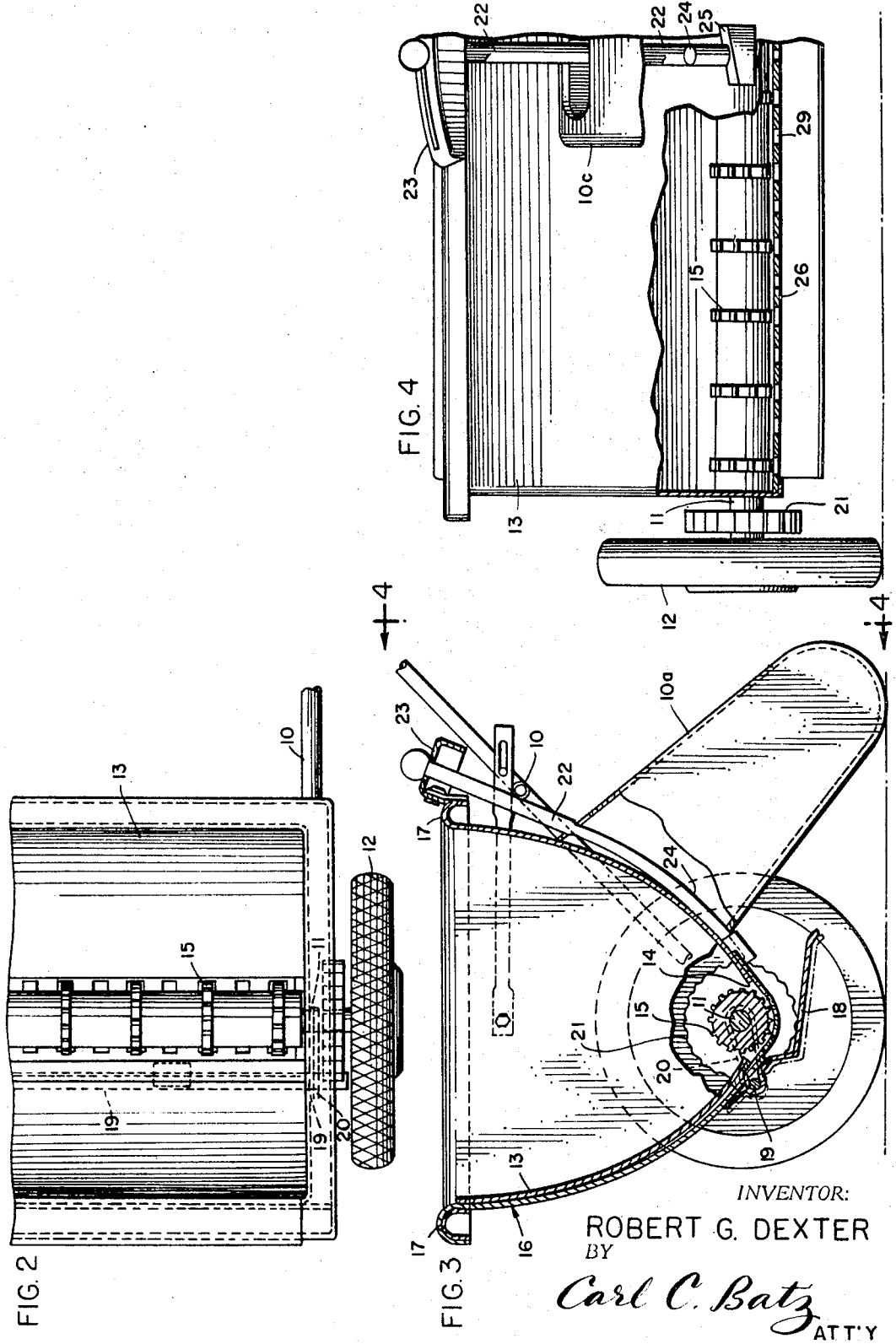

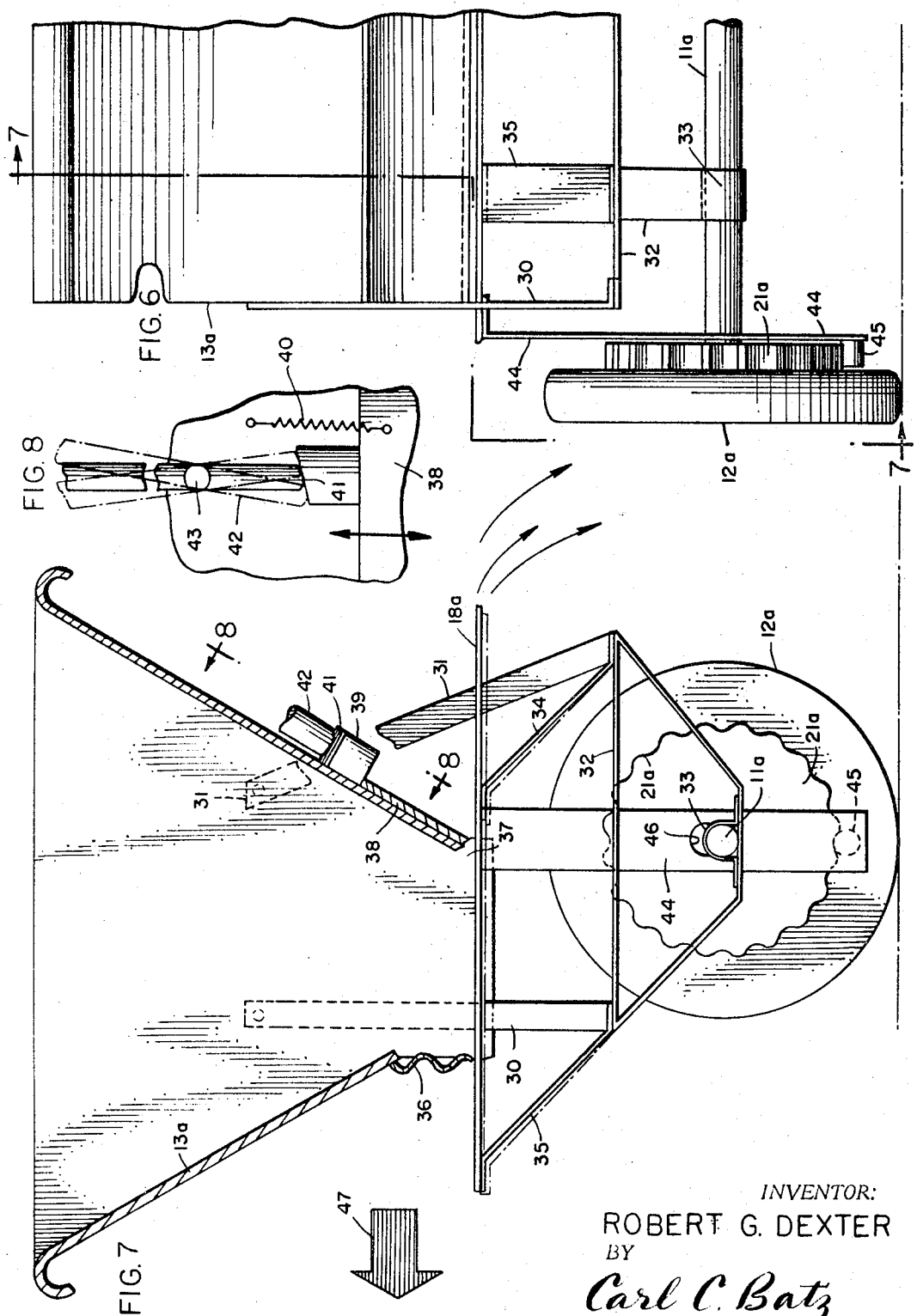

June 24, 1969  R. G. DEXTER  3,451,595
WHEELED VEHICLE VIBRATORY SPREADER FOR GRANULAR MATERIAL
Filed March 25, 1966  Sheet 5 of 5

INVENTOR:
ROBERT G. DEXTER
BY
Carl C. Batz
ATT'Y

United States Patent Office 3,451,595
Patented June 24, 1969

3,451,595
WHEELED VEHICLE VIBRATORY SPREADER
FOR GRANULAR MATERIAL
Robert G. Dexter, Lunenburg, Mass., assignor, by mesne assignments, to USS Agri-Chemicals, Inc., Pittsburgh, Pa., a corporation of Delaware
Filed Mar. 25, 1966, Ser. No. 537,410
Int. Cl. A01c 15/12; B65g 65/70
U.S. Cl. 222—177                                  7 Claims

ABSTRACT OF THE DISCLOSURE

A vehicle vibratory spreader including a hopper supported on a wheel-equipped axle and vibratory shelf member connected to the bottom wall of the hopper having an opening to meter the ejection of materials from the hopper according to ground speed. A pair of cams including a plurality of depressions are fixedly mounted on the axle and cam follower means is rigidly connected to the shelf member whereby rotation of the axle vibrates the shelf member. A control means may be provided for adjusting the extent to which the cam follower enters the depressions to thereby vary the amplitude of vibration and meter spread of materials. To facilitate substantial vibration, resilient means may be connected between the shelf member and both the hopper and a subjacent frame.

This invention relates to a vibratory spreader, and is particularly useful for the spreading of granular materials, such as granular fertilizer, etc.

Fertilizer spreaders presently being manufactured and sold are for the most part based on the same principle. They include a hopper to hold the fertilizer, an agitator which rotates to prevent bridging of the material, and a series of adjustable holes in the bottom of the hopper through which the material flows. A manual control is usually provided for shutting off the flow from the hopper when crossing driveways, etc. Such spreaders depend on gravity flow of the material through openings, and for a given opening setting, the flow per minute is constant regardless of speed over the ground. Hence, if the operator walks slowly, a much heavier layer of fertilizer will be spread than if he walks fast. It is desirable that the amount of flow be a function of speed of travel rather than time because this will give the same weight of spread at any speed of walking within reasonable limits.

An objection of this invention is to provide a spreader device which overcomes the objection set out above and provides for the spreading of granular material as a function of speed of travel. A further object is to provide a vibratory spreader for granular material of unique construction which is responsive to speed of walking for spreading the material with a constant feed proportional to the speed of walking. A further object is to provide a vibratory spreader effective for feeding fertilizer evenly as a function of speed of travel whether the device be moved along a hillside or inclination or in a horizontal plane. Yet another object is to provide in such a structure means for adjusting the spreader for varying the amplitude of the vibration. Other specific objects and advantages will appear as the specification proceeds The invention is shown, in illustrative embodiments, by the accompanying drawings, in which —

Figure 5:
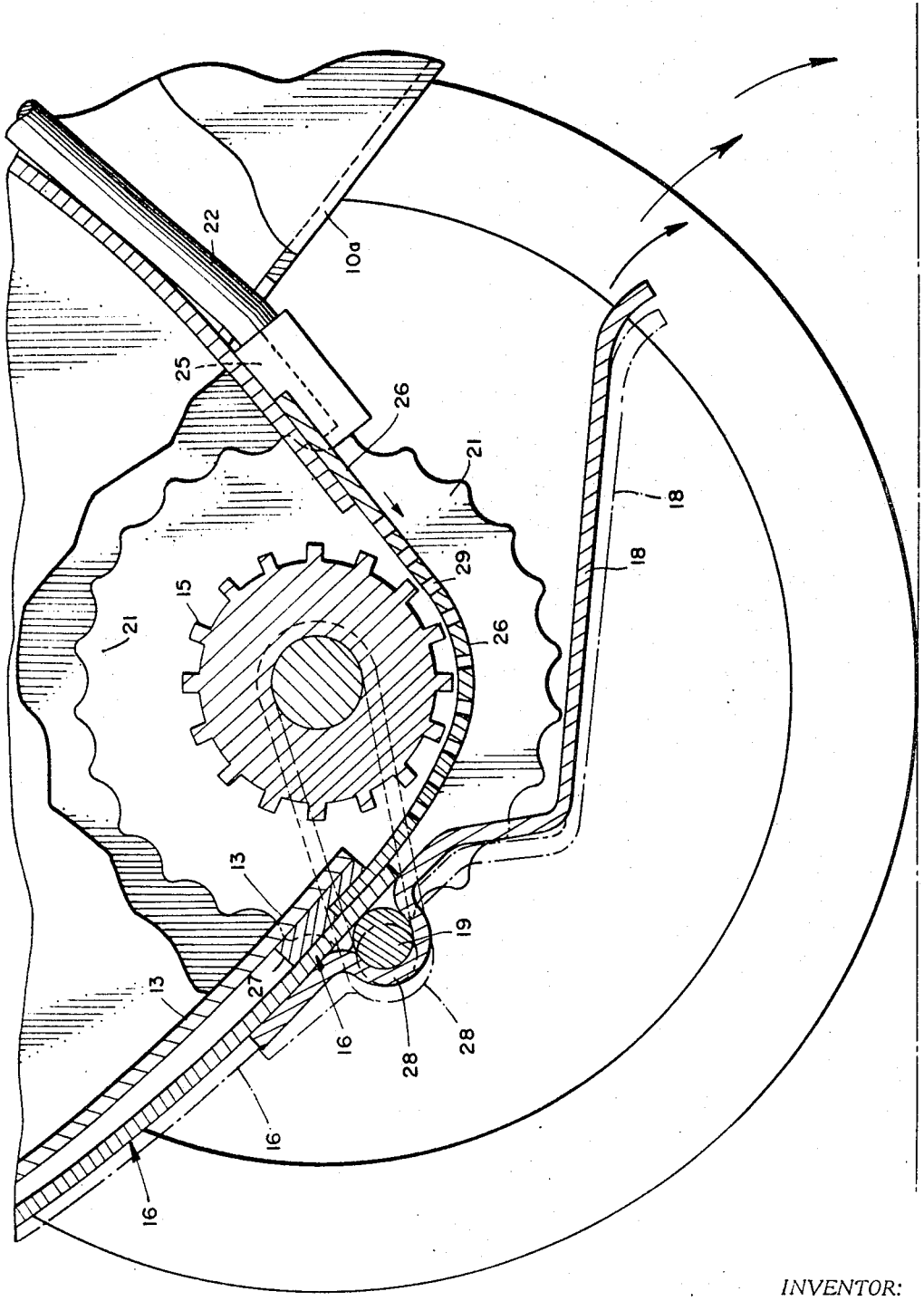
Figure 9:
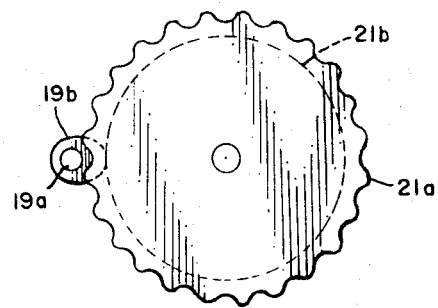
Figure 10:
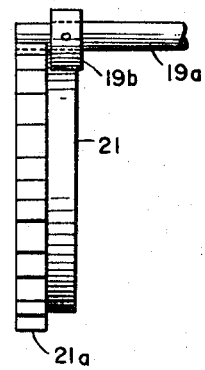

FIG. 1 is a perspective view of a vibratory spreader embodying my invention; FIG. 2, a broken sectional view, the section being taken as indicated at line 2—2 of FIG. 1; FIG. 3, a transverse sectional view, the section being taken as indicated at line 3—3 of FIG. 1; FIG. 4 a broken rear view, the view being taken as indicated at line 4—4 of FIG. 3; FIG. 5, a broken enlarged sectional view showing a portion of the structure at the bottom of FIG. 3; FIG. 6, a broken rear view in elevation of a modified form of vibratory spreader; FIG. 7, a vertical sectional view of the structure shown in FIG. 6, the section being taken as indicated at line 7—7 of FIG. 6; FIG. 8, a broken rear elevational view, the view being taken as indicated at line 8—8 of FIG. 7; FIG. 9, a side view in elevation of a further modified structure in which a shaft 19a similar to the shaft 19 of FIG. 3 is actuated for vibrating the dispensing shelf; FIG. 10, a broken front view in elevation of the structure shown in FIG. 9; and FIG. 11, a view similar to FIG. 10 but showing an adjusting means for controlling the amplitude of vibrations.

In the illustration given in FIGS. 1–5 inclusive, 10 indicates a handle-equipped frame supporting at the bottom an axle 11 upon which are mounted wheels 12. Upon the vehicle thus provided is mounted a hopper 13 having an open bottom portion 14. Mounted within the bottom portion of the hopper and upon the axle 11 is an agitator 15.

In order to support the frame 10 in a rest position, the frame 10 is provided with an inclined, rewardly-extending brace 10a which is adapted to engage the ground, as shown best in FIG. 3.

A vibratory shelf 16, as shown best in FIG. 3, is supported at one side upon the rim 17 of the hopper 13, and the shelf 16 which is fixed at its upper end to rim 17 extends downwardly to a point adjacent the opening 14 and then drops at an angle to provide a corrugated dispensing shelf portion 18. The shelf portion 18 is adapted to receive the granular material from the hopper 13 and, when the same is vibrated, to deliver the granular material rearwardly, as shown best in FIG. 1. While the shelf 18 may be of any desired shape or contour, I prefer to have this portion corrugated so that the granular material lies within the corrugations. When operating on a hillside, there is a tendency to feed more of the granular maturial at one side than at the other and this is prevented by the corrugations running longitudinally of the vibrating shelf and thus giving an even distribution even on a hillside.

In order to vibrate the shelf structure 16, I equip the shelf with a transverse rod 19, as shown best in FIGS. 2 and 3, and a coil garter spring 20 is extended between the rod and the axle 11. The rod 19 engages at each end of the axle 11 a cam member 21. The cam 21 has a series of grooves or depressions which receive the rod 19 and move it outwardly and inwardly, thus giving uniform vibrations to the shelf 16.

In order to vary the amplitude of the vibrations, I provide means for moving the rod 19 inwardly and outwardly. It will be understood that any suitable means for moving the rod may be employed. When the rod 19 is moved outwardly and held in the outer position, the rod will engage only the peripheral portions of the cam and the vibrations will be of low amplitude. On the other hand, when the rod 19 is moved so as to fall completely within the grooves, vibrations of greater amplitude will be obtained.

In the specific illustration given in FIGS. 1–5 inclusive, I provide a lever 22 extending through a slotted member 23 which may be provided with a scale, the lever being pivotally mounted at 24. The bottom of the lever 22 is provided with a cam 25 which on being swung laterally moves the member 26 forwardly and pushes the shelf member 16 carrying rod 19 outwardly and away from the cam member 21 so as to reduce the amplitude of the vibrations. The actuating member 26 slidably engages the hopper 13 and is fixed to a block 27, the block in turn being welded or secured to the shelf member 16.

As shown best in FIG. 5, the vibrator pan 18 which forms a part of the vibrating shelf member 16 has a looped portion 28 extending around the rod 19, and the upper portion of the member 18 is welded to the shelf member 16. Since the upper end of the shelf member 16 is fixed at its top to the rim 17 of the hopper 13, the forward movement of the member 16 forces the spring shelf member 16 outwardly, as indicated in dotted lines in FIG. 5, and at such outward position the rod 19 is held so that it engages only the crest of the cam projections on the member 21.

When the lever 22 is moved in the other direction so as to draw the actuating member 26 toward the right, as shown in FIG. 5, this action draws the shelf member 16 inwardly and thereby carries the rod 19 closer to the cam member 21 so that the rod can enter more deeply into the grooves or recesses of the cam, thus increasing the amplitude of vibrations.

The member 26 may be provided with openings 29 through which granular material is fed onto the vibrator pan 18. Such openings are left wide open so as to feed a maximum amount of granular material constantly to the pan 18. In other words, the openings 29 are not employed, as in conventional spreaders, for controlling the degrees of flow, but are left open so that the control is effected by the amplitude of the vibrating shelf 18. The chief function of the member 26 is to actuate the shelf 16 so as to move it outwardly and inwardly for positioning the rod 19 to obtain the desired amplitude of vibration.

In the foregoing structure, I prefer to form the cams 21 of nylon, and the rod 19 is preferably formed of metal or other suitable material.

OPERATION

In the operation of the apparatus, the hopper 13 may be filled with granular fertilizer or other material and the vehicle advanced to spread the material. The fertilizer passes through the openings in the member 26 onto the dispensing shelf 18. The shelf is vibrated by the rod 19 which engages the indentations of the cam member 21 located at each end of the axle 11. When it is desired to decrease the amplitude of the vibrations, the lever 22 may be swung laterally so as to press the member 16 forwardly and thus move the members 16 and 18 outwardly, thus supporting the rod 19 farther away from the cam 21. In such outer position, the rod 19 engages only the tip portions of the cam projections, with the result that the vibrations are reduced in amplitude. When the lever 22 is swung in the other direction, the lower end of the lever pivoting at 24 draws the member 26 rearwardly toward the frame member 18a, and this brings the members 16 and 18 closer to the axle 11, and the rod 19 enters more completely into the recesses of the cam 21 so that vibrations of greater amplitude are obtained.

The vibrating shelf member 16 since it pivots from the top of the hopper provides effective vibrations even with slight movement of the rod 19 in engagement with the cam 21, and the spreading of the fertilizer is accomplished as a function of speed of travel rather than time, and the same weight of spread is accomplished at any speed of walking within the normal limits.

When it is desired to move the spreader without feeding the material, as when crossing a driveway, it is only necessary to raise the handle sufficiently to prevent feeding because of the angle of the dispensing shelf 18.

In the modification shown in FIGS. 6–8 inclusive, the hopper 13a is provided with depending frame members 30 and 31 which support a rigid frame 32 carrying a bracket 33 in which the axle 11a is mounted. Upon the frame member 32 are mounted springs 34 and 35 carrying at their top a dispensing vibratory shelf 18a. A bellows sealing member 36 may be employed for sealing the area below the hopper 13a and the shelf 18a except as to the discharge point 37.

In order to control the flow of granular material through the outlet 37, I provide a gate 38 mounted on the member 39 and normally held in a rest position by the tension spring 40. The member 39 is pivoted at its top with a cam 41 and is actuated by a lever 42 mounted on pivot 43.

In the modification shown in FIGS. 6–8 inclusive, I provide structure for giving the dispensing shelf 18a vibrations of uniform amplitude. This is accomplished by a depending strap 44 connected to the dispensing shelf 18a at its top and provided at its bottom with a circular stud 45. The stud 45 engages the recesses of the cam member 21a and the member 44 is provided with an elongated opening 46 to permit the vertical movement of the vibrating strap 44. The arrow 47 at the left of FIG. 7 indicates the direction of movement of the vehicle.

In the operation of the structure shown in FIGS. 6–8 inclusive, the granular material is fed upon the dispensing shelf 18a and the shelf is vibrated at a uniform amplitude by the engagement of the stud 45 with the depressions of cam member 21a. By manipulating the gate 38 through the lever 42, the flow of material can be made proportionate to the speed of travel.

In the spreader structure, the fertilizer or other granular material may be fed directly from the hopper onto the dispensing vibrating pan, or, if desired, an intermediate perforated bottom sheet may be employed with the perforations or openings set for delivering a maximum amount of the granular material to the dispensing shelf. As a result, the dispensing shelf is the sole control means for delivering the granular material, and since the shelf is actuated by the axle-driven cam, the distribution of the granular material is directly proportional to the speed of the spreader vehicle.

Figure 11:
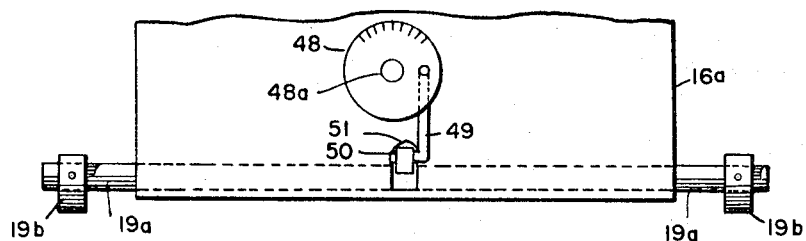

In the modification shown in FIGS. 9, 10 and 11, the shaft 19a, which is similar to shaft 19 of FIG. 3 and which is attached to the vibrator shelf for effecting vibrations of the shelf, is provided at each end thereof with an eccentric 19b. The cam member 21 at each end of the spreader is provided with a flange 21b, as shown best in FIG. 10. The outer cylindrical surface of flange 21b is engaged by the eccentric 19b so that when shaft 19a is rotated to vary the position of the eccentric 19b, the shaft will be adjusted outwardly or inwardly toward the recesses of the cam member 21a. Thus, a slight rotation of shaft 19a effects a movement of the eccentrics 19b and varies the position of the shaft 19a with respect to the recesses of the cam member 21a.

In FIG. 11, a simple means is illustrated for rotating the shaft 19a. In this structure, a dial member 48 is mounted on a pin 48a and may be rotated to bring the graduation marks thereon into line with a fixed marker. A link 49 has an end turned into a eccentric opening on the dial 48 and has its other end turned and received within a lever 50 extending outwardly from shaft 19a. The member 16a is apertured at 51 to permit movement of the lever 50. Thus, as the dial 48 is rotated, the link 49 is caused to rotate shaft 19a and thereby to space the shaft from the recesses of cam member 21 in order to vary the amplitude of movement of the shelf.

In the preferred form of the invention, the openings in the hopper bottom remain constant causing a pile to form on the vibrator shelf at its normal angle of repose. Varying the amplitude of the vibration, as effected by the structure described above in connection with FIGS. 9–11, determines the amount of flow. Thus, since vibrator frequency varies with speed of walking, the coverage becomes nearly constant regardless of speed.

I claim:

1. In a vehicle spreader for granular fertilizer, a frame, a hopper for fertilizer having openings in its bottom, a wheel-equipped axle supporting said hopper and frame, cams carried by said axle near the ends of the axle and fixed to said axle, said cams providing a series of depressions therein, a vibrator shelf member suspended upon the top of the hopper and extending down and below said hopper for receiving granular material from the hopper, a rod carried by said vibratory shelf and engaging the depressions of said cams, spring means normally urging said rod inwardly toward said cam depressions and control means for moving said rod inwardly and outwardly to vary the amplitude of movement of said rod.

2. The structure of claim 1 in which said vibratory shelf is equipped with a dispensing shelf portion having corrugations extending longitudinally thereof.

3. The structure of claim 1 in which said vibratory shelf receives granular material directly from said hopper in a maximum amount and said vibrating shelf constitutes the only means for controlling the distribution of said granular material.

4. A vehicle spreader for granular materials, said spreader comprising: a hopper for the materials, said hopper being open adjacent its upper end and having front, side, rear and bottom walls, said bottom wall having a material discharge opening means therethrough, and being moveable relative to at least one of said other walls, a vibratory shelf member coextensive with said opening means, said shelf member being connected to and suspended below said bottom wall, a wheel-equipped axle supporting said hopper, cam means fixed to said axle, cam follower means connected to said shelf member and bottom wall and cooperating with said cam means, and moveable control means for moving said bottom wall and said shelf member for varying the amplitude of vibration of said shelf member by controlling contract of said cam follower means with said cam means.

5. A vehicle spreader according to claim 4 wherein said control means is connected to at least one of said other walls.

6. A vehicle spreader according to claim 4 wherein said control means includes rod means rotatably mounted on said shelf member, said rod means including eccentric means for moving said cam follower means relative to said cam means.

7. A vehicle spreader for granular materials, said spreader comprising: a frame, a wheel-equipped axle connected to and below said frame, a hopper having an opening adjacent the bottom thereof defined by a periphery fixedly connected to and above said frame, a vibratory shelf member moveably interposed between said hopper and said frame adjacent the hopper opening, spring means moveably connecting said shelf member to said frame, resilient means connecting a portion of said periphery to said shelf member, cam means fixed to said axle, cam follower means rigidly connected to said shelf member, said cam follower means engaging said cam means, and gate means adjacent the hopper opening cooperating with said shelf member to selectively meter material ejected from said hopper.

References Cited

UNITED STATES PATENTS

| | | | |
|---|---|---|---|
| 656,329 | 8/1900 | Schulte-Blome | 239—659 |
| 880,908 | 3/1908 | Niebel | 239—659 |
| 1,157,370 | 10/1915 | Cox | 222—177 |
| 1,819,935 | 8/1931 | Whitaker et al. | 239—659 |
| 2,095,596 | 10/1937 | Dixon | 239—659 |
| 2,290,712 | 7/1942 | Robinson | 222—199 X |
| 3,207,379 | 9/1965 | Waldrum | 222—177 |
| 3,278,090 | 10/1966 | Wahl | 222—199 |

FOREIGN PATENTS 273,052  6/1927  Great Britain.

STANLEY H. TOLLBERG, *Primary Examiner.*

U.S. Cl. X.R.

222—199